United States Patent [19]

Knight, IV et al.

[11] 3,817,552

[45] June 18, 1974

[54] OCCUPANT RESTRAINT SYSTEM

[75] Inventors: John W. Knight, IV, Mt Clemens; Herbert A. Libkie, Marlette; Ben C. Parr, Orchard Lake; Carl M. Savage, Jr., Milford, all of Mich.

[73] Assignee: General Motors Corporation, Detroit, Mich.

[22] Filed: Aug. 25, 1972

[21] Appl. No.: 283,642

[52] U.S. Cl. .......................................... 280/150 AB
[51] Int. Cl. ............................................ B60r 21/08
[58] Field of Search .............................. 280/150 AB

[56] References Cited
UNITED STATES PATENTS

| | | | |
|---|---|---|---|
| 2,755,125 | 7/1956 | Hodges | 280/150 AB |
| 3,602,527 | 8/1971 | Goetz | 280/150 AB |
| 3,625,543 | 12/1971 | Wolff | 280/150 AB |
| 3,640,546 | 2/1972 | Brawn | 280/150 AB |

Primary Examiner—David Schonberg
Assistant Examiner—Terrance L. Siemens
Attorney, Agent, or Firm—Herbert Furman

[57] ABSTRACT

A vehicle body instrument panel includes an upper wall provided with a generally L-shaped recess extending transversely of the body. A generally U-shaped housing has its lower leg seating on and secured to the base wall of the recess and the bight portion thereof adjacent the forward wall of the recess. An elongated diffuser complementary in shape to the bight portion is fitted therewithin. The flattened ends of the diffuser are secured to the side walls of the housing. An inflatable cushion has one closed end receiving the diffuser and inflated therefrom. A cover has a return bent forward leg secured to the upper leg of the housing and the rear edge thereof received within a groove of an energy absorbing cover of the instrument panel. An inflator has an outlet neck projecting through the upper wall of the instrument panel and the lower leg of the housing into the diffuser. A bayonet-type connection releasably secures the inflator to the diffuser.

8 Claims, 7 Drawing Figures

OCCUPANT RESTRAINT SYSTEM

This invention relates generally to vehicle body occupant restraint systems and more particularly to systems of the type which include a cushion received within and secured to a housing recessed into the upper wall of the instrument panel for deployment from such housing rearwardly of the body to a position between the occupant and the instrument panel.

One of the features of this invention is that the instrument panel is provided with a recess in its upper wall which receives and mounts a generally U-shaped housing, the legs of which define a throat extending rearwardly and upwardly of the body, with the occupant restraint cushion being secured within the housing and being received within the throat when undeployed. Another feature of this invention is that a diffuser, complementary in shape to the bight portion of the housing, is received within an end portion of the cushion and retained within the housing by the flexibly related legs thereof. A further feature of this invention is that the terminal portions of the legs of the housing are offset with respect to the remainder of the legs to define the throat. Yet another feature of this invention is that an inflator is located normal to the housing and diffuser generally centrally thereof and is releasably secured to the diffuser. Yet a further feature of this invention is that the inflator includes an outlet neck which projects through the instrument panel and lower leg of the housing into the diffuser and is releasably secured to the diffuser by a bayonet-type connection.

These and other features of the system of this invention will be readily apparent from the following specification and drawings wherein.

Figure 1:
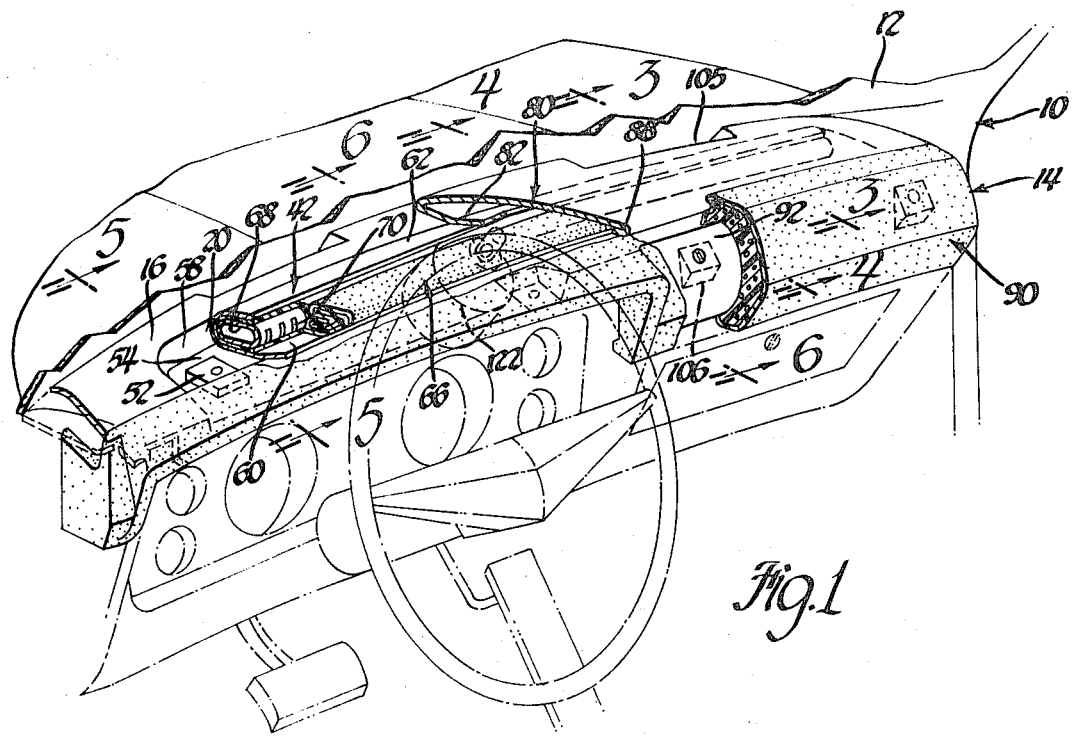
FIG. 1 is a partially broken away perspective view of the instrument panel structure of a vehicle body embodying an occupant restraint system according to this invention, with the cushion being shown undeployed.

Referring now to the drawings, an automobile or vehicle body designated generally 10 includes a windshield 12 and an instrument panel structure designated generally 14. As shown best in FIG. 7, the instrument panel structure 14 includes an upper wall designated generally 16 and a rear wall designated generally 18. The upper wall 16 includes a recess 20 which extends for the major extent of the upper wall intermediate the windshield pillars of the body.

Figure 3:
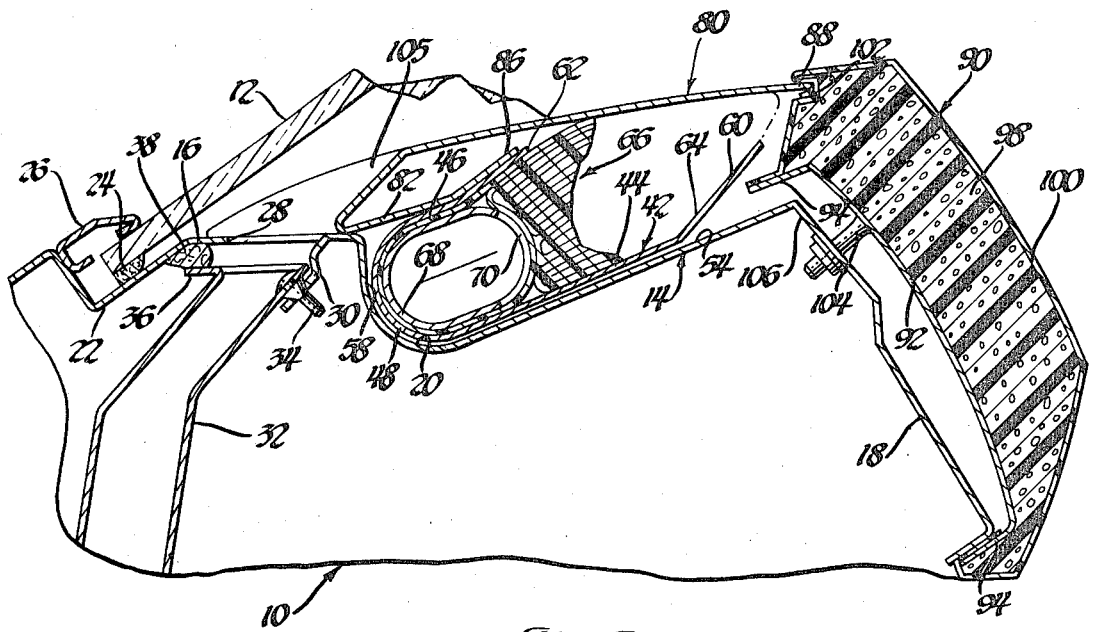
FIG. 3 is an enlarged sectional view taken generally along the plane indicated by line 3—3 of FIG. 1.
Figure 4:
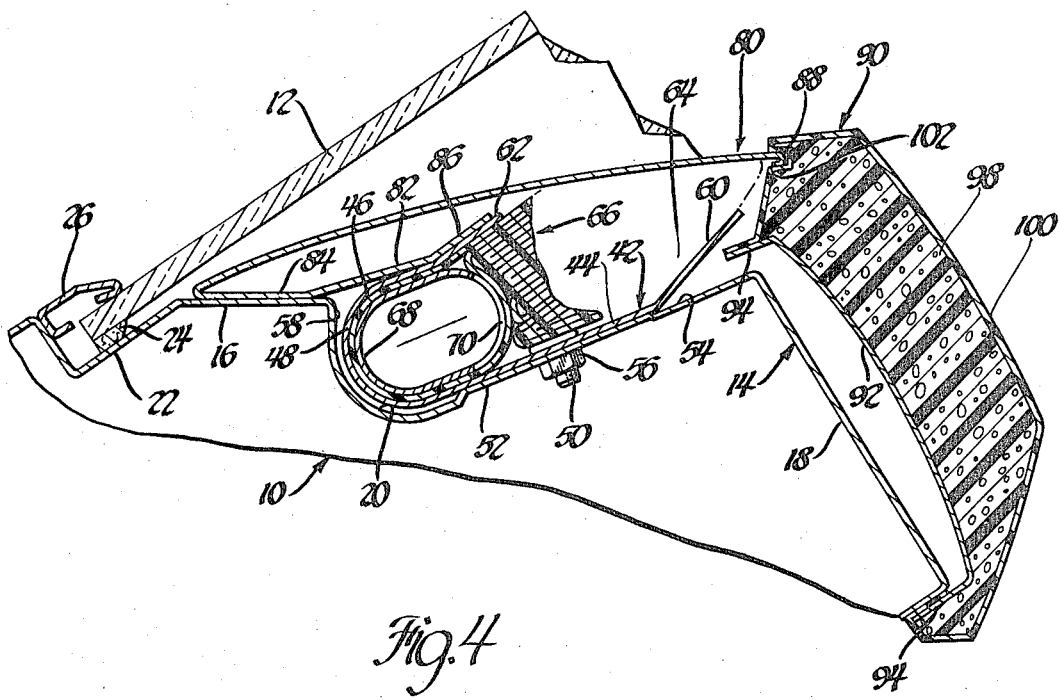
FIG. 4 is an enlarged sectional view taken generally along the plane indicated by line 4—4 of FIG. 1.
Figure 7:
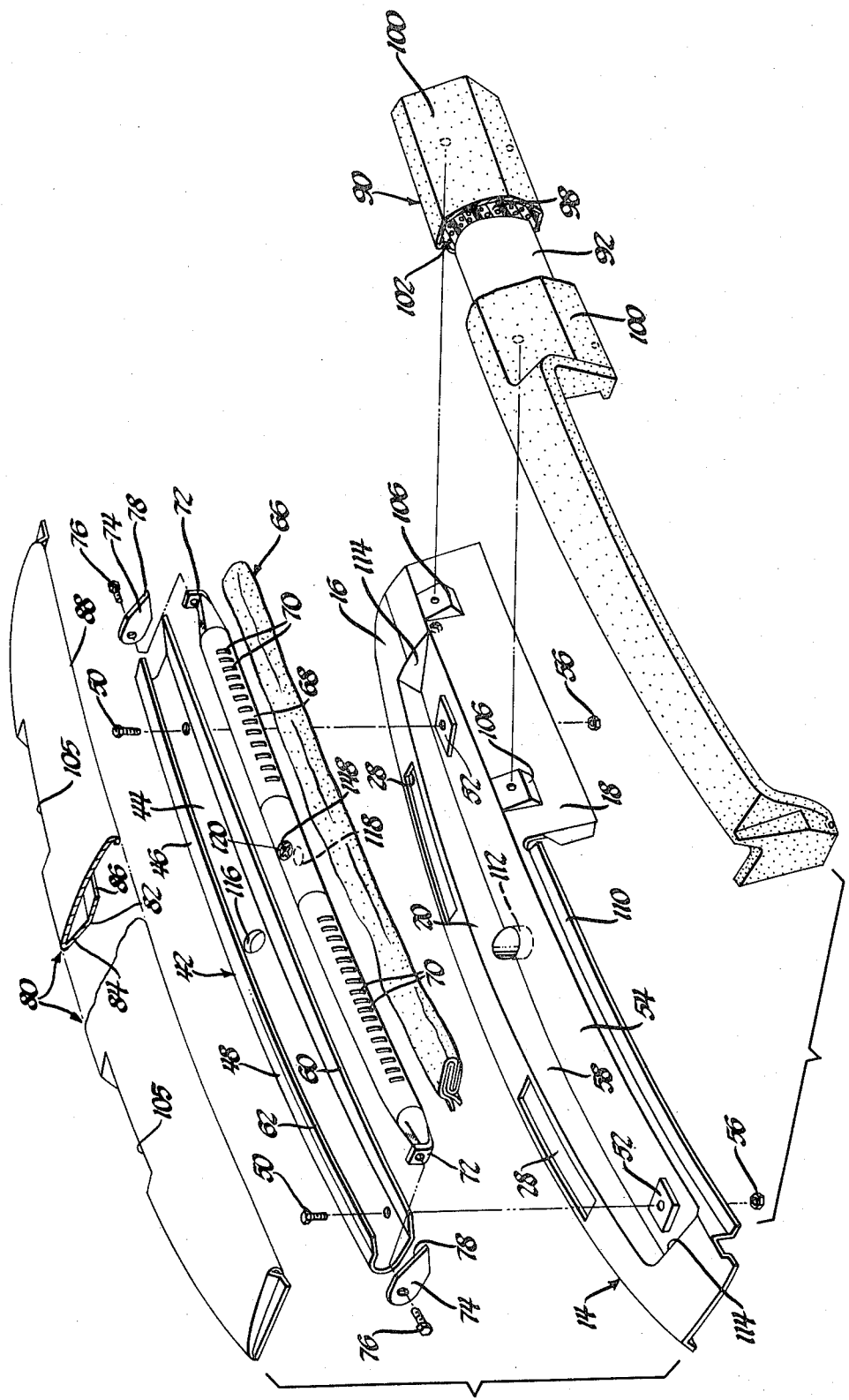
FIG. 7 is an exploded perspective view of portions of FIG. 1.

As shown in FIG. 4, the wall 16 includes an offset flange 22 which is connected in a conventional manner with the cowl structure, not shown, of the body. The lower edge of the windshield 12 is received within the offset flange 22 and adhesively secured thereto at 24. A garnish molding 26 completes the assembly. As shown in FIGS. 3 and 7, the wall 16 includes a pair of elonaged openings 28 which provide defroster outlets.

As shown in FIG. 3, the material of the opening is bent laterally to provide an off-set flange 30 which is secured to the rear wall of the d defroster by a suitable fastener 34. The forward and side walls of the duct are flanged at 36 and adhesively secured at 38 to the upper wall around the forward and side edges of the openings 28.

A generally U-shaped housing 42 includes a lower leg 44 and an upper leg 46 which are joined by a bight portion 48. As shown in FIGS. 3 through 6, the housing 42 is received within the recess 20 and retained therein by means of bolts 50, FIGS. 4 and 7, which extend through apertures in the lower leg 44 and apertured pads or embossments 52 of the lower wall 54 of the recess, with the bolts being secured to the embossments by nuts 56. The lower leg 44 of the housing is slightly spaced from the base wall 54 of the recess intermediate embossments 52, and the bight portion 48 of the housing is slightly spaced from the forward or end wall 58 of the recess 20.

Figure 5:
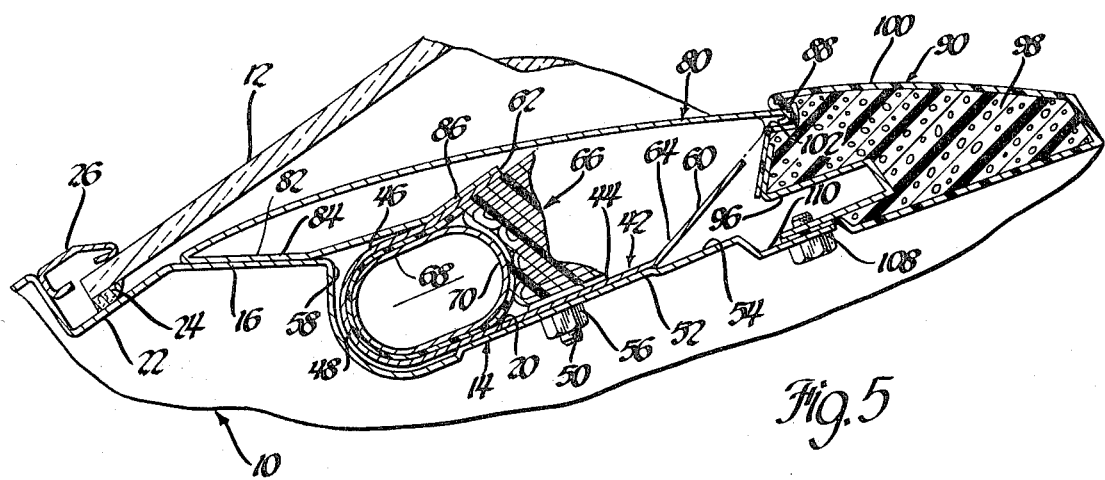
FIG. 5 is an enlarged sectional view taken generally along the plane indicated by line 5—5 of FIG. 1.

The respective terminal portions 60 and 62 of the lower leg 44 and upper leg 46 are offset with respect to the remainder of the legs as shown in FIGS. 3 through 5 to define a throat 64 which opens or extends generally rearwardly and upwardly of the body.

Figure 2:
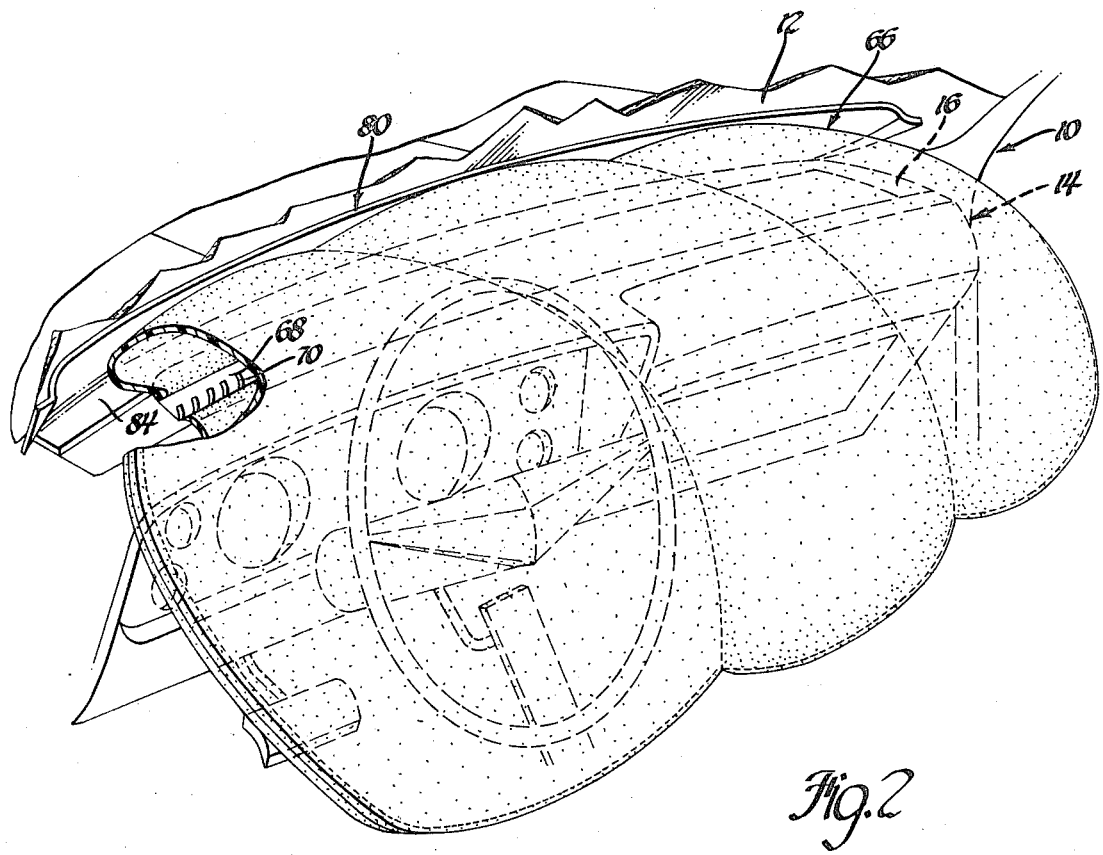
FIG. 2 is a view similar to FIG. 1 showing the cushion deployed.

An inflatable cushion 66 is received within the throat 64 when undeployed. The cushion 66 is not shown in detail herein but is disclosed in detail in copending applications Ser. No. 255,025 Parr et al and Ser. No. 255,026 Knight IV et al., both filed May 19, 1972 and assigned to the assignee of this invention. Generally the cushion includes an elongated flattened umbilical portion having a closed forward end portion which receives the diffuser and is secured to the housing by such diffuser as will be described, to mount the cushion to the housing. The elongated flattened umbilical portion opens at its rearward end to a pillow portion intermediate the upper and lower edge portions thereof so that the cushion is generally of T-shape cross section. The pillow portion is erected rearwardly of the rear wall 18 of the instrument panel and of the steering wheel as shown in FIG. 2. Both the umbilical portion and the pillow portion are stitched transversely at two places intermediate their side edges as can be seen in FIG. 2 to divide both portions into three compartments which respectively communicate with each other.

A diffuser 68 of generally oval or flattened cylindrical cross section as can be seen in FIGS. 3 and 4 is received within the closed forward end portion of the umbilical portion of cushion 66 and then fitted within the bight portion 48 of the housing 42. Generally the diffuser and bight portion are of complementary shape and there is slight interference fit between the two such that the diffuser is retained by the legs 44 and 46 of the housing which are flexibly related to the bight portion. The diffuser is provided in one circular end wall with two spaced longitudinal groups of slots 70 which open to the umbilical portion of the cushion and provide for transmission of pressure fluid from within the diffuser to the cushion 66 to inflate the cushion.

As best shown in FIG. 7, the ends of the diffuser project outwardly of cushion 66 and are flattened at 72 and bent laterally or radially to the axis of the diffuser. Each such end is centrally apertured. These ends abut the end plates or side walls 74 of the housing 42 and are bolted thereto at 76 to additionally secure the diffuser to the housing. The end plates are welded to the housing and close the sides of the housing. It will be noted that the edges 78 of the end plates extend between the edges of the legs 60 and 62.

A cover plate 80 includes a return bent offset leg 82 having a flange portion 84 bearing against the upper wall 16 of the instrument panel forward of recess 20, and a flange portion 86 which is welded to the terminal portion 62 of the upper leg 46 of the housing. The juncture of leg 82 with the cover assembly provides a hinge for forward swinging movement of the cover plate 80 relative to the instrument panel structure 14 as will be described. The rearward edge of the cover plate has a slight return bent terminal leg 88 which provides a releasable latch with the instrument panel cover as will be described.

As shown in FIG. 7, the instrument panel cover 90 includes a metal base or back having a first portion 92 which is slightly curved and provided with flanged edges 94 as shown in FIGS. 3 and 4. The base portion 92 merges into a U-shaped base portion 96, FIG. 5, at the instrument cluster area of the instrument panel.

Both the base portions 92 and 96 are covered with a suitable foam material 98, such as foam urethane or foam vinyl, which is shaped to the desired external contour. The foam material is secured to a suitable decorative covering 100 such as supported vinyl, with the edges of this trim material extending over exposed sides of flanges 94, FIGS. 3 and 4, and exposed edges of base portion 96, FIG. 5, and being adhesively secured thereto. With specific reference to FIGS. 3, 4, and 5, it will be noted that the covering 100 and the foam material 98 cooperatively define a groove 102 which receives and releasably retains the return bent rearward leg 88 of the cover plate 80. The cover plate 80 has a slight crown and this aids in applying a slight resilient bias forcing the rear leg 88 of the cover plate into the groove 102. The cover 90 is mounted on the instrument panel structure by means of studs 104 which are welded to the base portion 92 and bolted to integral embossments 106 of the rear wall 18 of the instrument panel structure. The base portion 96 is bolted at one or more places at 108 to an offset flange 110 of the instrument panel structure 14. Bolts 108 may additionally secure the instrument cluster to the structure 14. Likewise, a lower instrument panel structure may be additionally secured to the structure 14 and to the cover 90. Such a lower structure, as well as the instrument cluster, are indicated by dash lines in FIGS. 1 and 2 and are conventional.

As shown in FIGS. 3 and 7, the cover plate 80 is provided with integral recesses 105 which provide outlets for the defroster ducts 32 and the openings 28 so that air from the defroster ducts can pass through the cover plate to the windshield 12.

Figure 6:
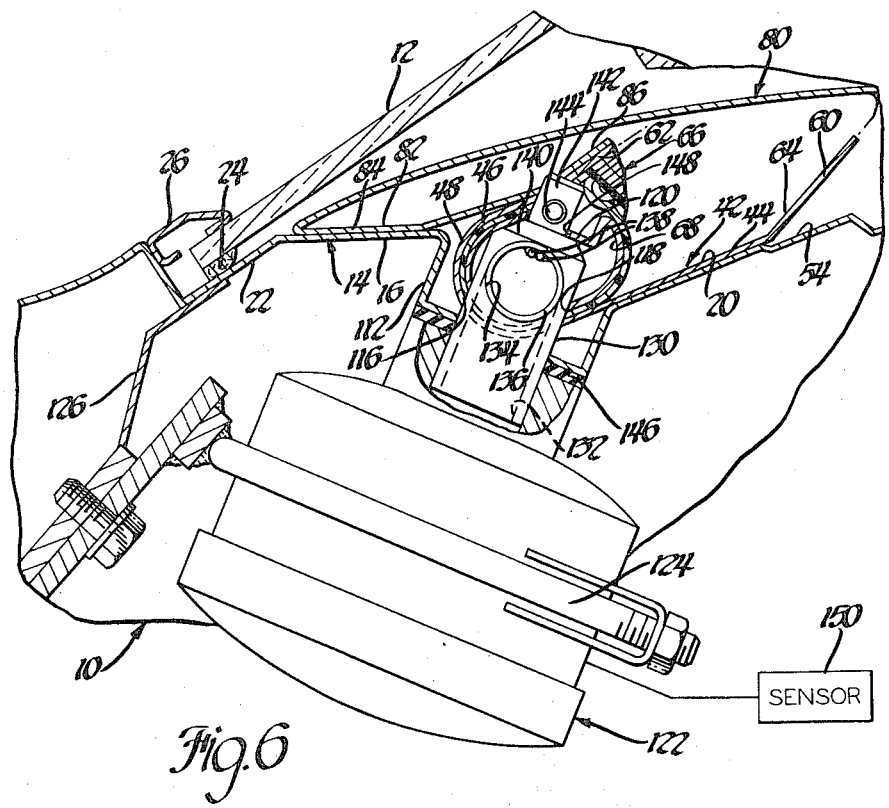
FIG. 6 is an enlarged sectional view taken generally along the plane indicated by line 6—6 of FIG. 1.

With reference now to FIGS. 6 and 7, walls 54 and 58 of recess 20 are shaped to provide a circular apertured embossment 112 intermediate the side walls 114 of the recess. This embossment is aligned with a circular opening 116 provided in the lower leg 44 of the housing 42. Likewise, as shown in FIG. 6, the diffuser 68 is provided with an opening 118 in alignment with the opening 116, and further provided with a recessed circular portion 120 axially aligned with the opening 118 and having a keyhole slot therein.

An inflator 122, shown as a gas generator, is mounted by means of a conventional U bolt 124 to the cowl 126 of the body. The inflator includes an axially extending circular cross section outlet or neck 130 which is axially bored at 132. Bore 132 opens to a radial through bore 134 and a tube 136 fits within the bore 134 and is welded at its ends to the outer surface of neck 130 to thereby normally close bore 132. Suitable detonators 138 are potted within the tube 136 for a purpose to be hereinafter described. The neck 130 includes a tapered closed end wall 140 and a terminal stem or end 142 provided with a cross pin 144.

The neck 130 of inflator 124 extends through the opening of embossment 112 and the openings 116 and 118. The radial shoulder between the inflator body and neck seats against a suitable sealing washer 146 provided on the base wall of the offset. The cross pin 144 is located transverse of the keyhole slot 148, FIG. 7, in the base wall of the recess 120 to releasably retain the inflator to the diffuser. The pin 144 and slot 148 additionally provide an index to ensure that the bore 134 and tube 136 always open longitudinally of the diffuser. As shown in FIG. 6, legs 46 and 86 are provided with circular openings to permit receipt of end 142 and pin 144 therethrough.

As indicated in FIG. 6, the inflator 122 is actuated by a sensor 150 of any suitable type, one which senses either velocity changes or acceleration pulses of predetermined amplitude and time generated by contact of the body 10 with an obstacle, and electrically connects the inflator with a source of power, such as the vehicle battery. Likewise, the sensor 150 simultaneously connects the detonators 138 with the same source so that the detonators blow out a portion of the wall of the tube 136 opposite bore 132 so that the pressure fluid generated by the inflator flows through the bore 132 and thence into the diffuser 68 through both open ends of tube 136 to deploy or erect the cushion 66 as shown in FIG. 2.

When the cushion 66 is deployed from the throat 64, the cover plate 80 is swung forwardly and upwardly of the body against the windshield 12 as this plate swings about the integral hinge provided between the plate body and the leg 82 thereof. The return bent terminal leg 88 of the cover plate is snapped out of the groove 102 to release the cover plate for such forward swinging movement. Thus the integral hinge provided by the cover plate and the mounting of the cover plate on the upper leg 46 of the housing provide a very convenient closure for the recess in the upper wall 16 of the instrument panel. Additionally, the leg 88 and the groove 102 provide a convenient releasable latch for the cover plate which is automatically released when the cushion 66 is deployed.

The system of this invention can be easily preassembled prior to installation on the body by welding the end plates or side walls 74 to the housing 42 to complete the housing. The diffuser 68 is thereafter fitted within the closed forward end portion of the umbilical portion of the cushion in a conventional manner, with the ends of the diffuser, of course, projecting through suitable openings in the sides of such umbilical portion. The diffuser and cushion assembly is then snapped into the bight portion 48 of the housing and the ends 72 of the diffuser bolted to the end plate 74 of the housing. The legs 44 and 46 of the housing are slightly forced apart when the diffuser and cushion assembly are fitted within the bight portion and this flexible relation of the legs to the bight portion aids in retaining the assembly within the housing.

Thus, this invention provides an improved occupant restraint system.

We claim:

1. The combination comprising, a vehicle body having a windshield and an instrument panel structure extending rearwardly from the windshield and including an upper wall provided with a recess including a forward end wall and a base wall of greater extent and extending generally laterally of the end wall and rearwardly and upwardly of the body, a generally U-shaped housing located within the instrument panel recess and having the bight portion thereof located adjacent the end wall and one of the spaced legs thereof supported on the base wall, the terminal portions of the spaced legs being shaped to define a throat extending upwardly and rearwardly of the body, a diffuser complementary in shape to the bight portion of the housing and received therein for communication with a source of pressure fluid, an inflatable occupant restraint cushion received within the throat of the housing when uninflated in fluid communication with the diffuser, the cushion being projected rearwardly and upwardly of the body from the throat upon communication of the diffuser with a source of pressure fluid, and releasable cover means extending over the recess and housing and being released upon inflation of the cushion.

2. The combination recited in claim 1 wherein the releasable cover means includes a cover member hingedly secured to one of the legs of the U-shaped housing, and means releasably securing the cover member to the instrument panel structure adjacent the other leg of the housing.

3. The combination recited in claim 1 wherein the instrument panel structure includes cushion means located adjacent the recess and rearwardly of the housing, and the cover means includes a cover member hingedly secured to the housing, and means releasably securing the cover member to the cushion means.

4. The combination comprising, a vehicle body having a windshield and an instrument panel structure including an upper wall extending rearwardly from the windshield, the upper wall being provided with a recess including a forward end wall and a base wall of greater extent and extending generally laterally of the end wall and rearwardly and upwardly of the body, a generally U-shaped housing having one leg thereof supported on the base wall of the recess, the bight portion thereof positioned adjacent the end wall of the recess and the other leg thereof of lesser extent than the one leg thereof and located in vertically spaced relationship to the one leg, the terminal portions of the spaced legs being offset and shaped to define a throat extending upwardly and rearwardly of the body, a diffuser complementary in shape to the bight portion of the housing and received therein for communication with a source of pressure fluid, an inflatable occupant restraint cushion received within the throat of the housing when uninflated in fluid communication with the diffuser, the cushion being projected from the throat upon communication of the diffuser with a source of pressure fluid, and releasable cover means extending over the recess and housing and being released upon inflation of the cushion.

5. The combination comprising, a vehicle body having a windshield and an instrument panel structure including an upper wall extending rearwardly from the windshield and provided with a recess therein having a base wall extending rearwardly and upwardly of the body and a forward lateral end wall, a generally U-shaped housing having the lower leg thereof supported on the base wall of the recess and the bight portion thereof positioned adjacent the forward end wall, the terminal portion of the lower leg being offset from the base wall and the terminal portion of the upper leg being offset, said terminal portions cooperatively defining a rearwardly and upwardly extending throat, diffuser means received within the bight portion of the housing for communication with a source of pressure fluid, an inflatable occupant restraint cushion received within the throat when uninflated, means mounting the cushion to the housing in fluid communication with the diffuser means, and releasable cover means covering the housing and being released upon inflation of the cushion from the diffuser means and projection of the cushion from the throat.

6. The combination comprising, a vehicle body having a windshield and an instrument panel structure including an upper wall extending rearwardly from the windshield and provided with a recess therein, a generally U-shaped housing located within the instrument panel recess and including a bight portion and a pair of flexibly related generally parallel legs having the terminal portions thereof shaped to define a throat extending upwardly and rearwardly of the body, a diffuser complementary in shape to the bight portion of the housing and legs and received therein, an inflatable occupant restraint cushion received within the throat of the housing when uninflated, means mounting the cushion to the diffuser in fluid communication therewith, the cushion being projected from the throat upon communication of the diffuser with a source of pressure fluid, and releasable cover means extending over the recess and housing and being released upon inflation of the cushion.

7. The combination comprising, a vehicle body having a windshield and an instrument panel structure including an upper wall extending rearwardly from the windshield and provided with a recess therein having an apertured base wall, a generally U-shaped housing having a lower leg seating on the base wall of the recess and provided with an aperture aligned with the base wall aperture, the legs of the housing defining a throat extending upwardly and rearwardly of the body, a diffuser received within the bight portion of the housing and including an aperture in the wall thereof opening to the housing aperture, an inflator having an outlet portion projecting through the aligned apertures into the diffuser, cooperating means on the outlet and diffuser releasably securing the inflator to the diffuser, an inflatable occupant restraint cushion received within the throat of the housing when uninflated, and means mounting the cushion to the diffuser in fluid communication therewith, the cushion being projected from the throat upon communication of the diffuser with the inflator.

8. The combination recited in claim 7 wherein the cooperating means include cooperating pin and slot means on the outlet and diffuser providing a bayonet-type releasable connection between the inflator and the diffuser.

* * * * *